United States Patent

Kreft

[11] Patent Number: 5,995,023
[45] Date of Patent: *Nov. 30, 1999

[54] ORIENTATION AND NAVIGATION DEVICE WITH SATELLITE SUPPORT

[75] Inventor: Peter Kreft, Hildesheim, Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/619,651
[22] PCT Filed: Sep. 9, 1994
[86] PCT No.: PCT/DE94/01036
  § 371 Date: Mar. 27, 1996
  § 102(e) Date: Mar. 27, 1996
[87] PCT Pub. No.: WO95/09348
  PCT Pub. Date: Apr. 6, 1995

[30] Foreign Application Priority Data

Sep. 28, 1993 [DE] Germany .............. 43 32 945

[51] Int. Cl.⁶ .................................................. G08G 1/123
[52] U.S. Cl. ...................... 340/995; 340/988; 701/208; 701/210
[58] Field of Search .................... 340/995, 990, 340/988; 701/214, 216, 210, 208, 211, 213

[56] References Cited

U.S. PATENT DOCUMENTS

| | | | |
|---|---|---|---|
| 4,963,864 | 10/1990 | Iihoshi et al. | 340/995 |
| 5,257,195 | 10/1993 | Hirata | 701/216 |
| 5,293,318 | 3/1994 | Fukushima | 701/216 |
| 5,349,530 | 9/1994 | Odagawa | 701/214 |
| 5,416,712 | 5/1995 | Geier et al. | 701/216 |
| 5,422,639 | 6/1995 | Kobayashi et al. | 701/216 |
| 5,485,385 | 1/1996 | Mitsugi | 701/214 |

FOREIGN PATENT DOCUMENTS 0 181 012  8/1985  European Pat. Off. .
0 537 499 A1  9/1992  European Pat. Off. .

OTHER PUBLICATIONS

Von Ernst et al. "EVA –An Autonomous Orientation and Navigation System for Land Craft", Bosch Technical Reports, vol. 8, 1986, pp. 7–14.

*Primary Examiner*—Brent A. Swarthout
*Attorney, Agent, or Firm*—Kenyon & Kenyon

[57] ABSTRACT

An orientation and navigation device provides for a current vehicle position to be displayed on a map. To make corrections in the event of loss of orientation, a satellite receiver is employed, which calculates a new vehicle position from the received satellite data and bases the dead reckoning on this new vehicle position. Since the calculated satellite orientation position is encumbered with a variation range, an optimization is performed by means of a low-pass filter and empirically determined values.

41 Claims, 3 Drawing Sheets

ORIENTATION AND NAVIGATION DEVICE WITH SATELLITE SUPPORT

BACKGROUND OF THE INVENTION

The present invention is based on an orientation and navigation device for a motor vehicle.

BACKGROUND INFORMATION

Various orientation and navigation devices are already known where a current vehicle position is displayed on a map of a display unit and the position is continually fed back positively. A device of this type is disclosed, for example, by Bosch Technical Reports, volume 8, 1986, issue 1/2, "EVA—An Autonomous Orientation and Navigation System for Land Craft", pp. 7–14. In addition, a satellite-navigation system called GPS system (Global Positioning System) is known, which calculates a terrestrial position based on positional data received from three or four satellites in the sky. For cleared general applications, the positional determination using the GPS System has a position-finding accuracy of about 100 m. Moreover, the accuracy also depends on the altitude position and the number of satellites being received. Therefore, in city zones where a perfect satellite reception is not always guaranteed, a positional determination is not always possible. On the other hand, it can happen when working with "travel pilot" that the magnetic-field sensor is disturbed by magnetization effects of the vehicle or by strong stray magnetic fields. When the vehicle is driven over non-digitized areas or transported on a ferry or train, the orientation is lost. The navigation device has to be reset again each time. It may be that this can be done through operator input of a few keys, but it does not take place automatically. Therefore, the ease of use is restricted.

SUMMARY OF THE INVENTION

The advantage of the orientation and navigation device according to the present invention is that in the event of loss of orientation or faulty position finding, which is immediately recognizable on the map of the display, the position can be automatically corrected with the aid of the satellite-navigation device. It is especially advantageous that the navigation device is also set up, i.e., the present position is automatically initialized through the satellite-navigation device without the driver having to do anything. As a result, the driver is not distracted from the ongoing traffic.

By ascertaining the variation range for the satellite-based position finding, one is able to advantageously delimit the error that is recorded when the exact position of the vehicle is determined. Since the accuracy of the satellite-based position finding essentially depends, inter alia, on the number and the configuration of the satellites being simultaneously received, a relatively reliable range can be determined for the vehicle position. The vehicle position is refined/optimized by means of a comparison (map matching) in accordance with a plausibility check on the displayed map. If the street currently travelled on is situated, as determined by dead-reckoning and map matching, within the variation range of the satellite-based position finding, then one can advantageously assume that the vehicle position managed by the orientation and navigation system is correct.

It is also favorable for check-testing purposes for the satellite-based position finding to be output on the display. This allows the driver to visualize the measured position in relation to the displayed map. Also, by using the appropriate cursor keys, it is simple to manually correct the position of the vehicle on the displayed map.

Beneficial, above all, is the automatic setting up of the orientation and navigation system with the aid of the satellite-based position finding. The driver of the vehicle no longer has to do the set-up manually and is, therefore, no longer distracted from the ongoing traffic.

DETAILED DESCRIPTION OF THE DRAWINGS

Figure 1:
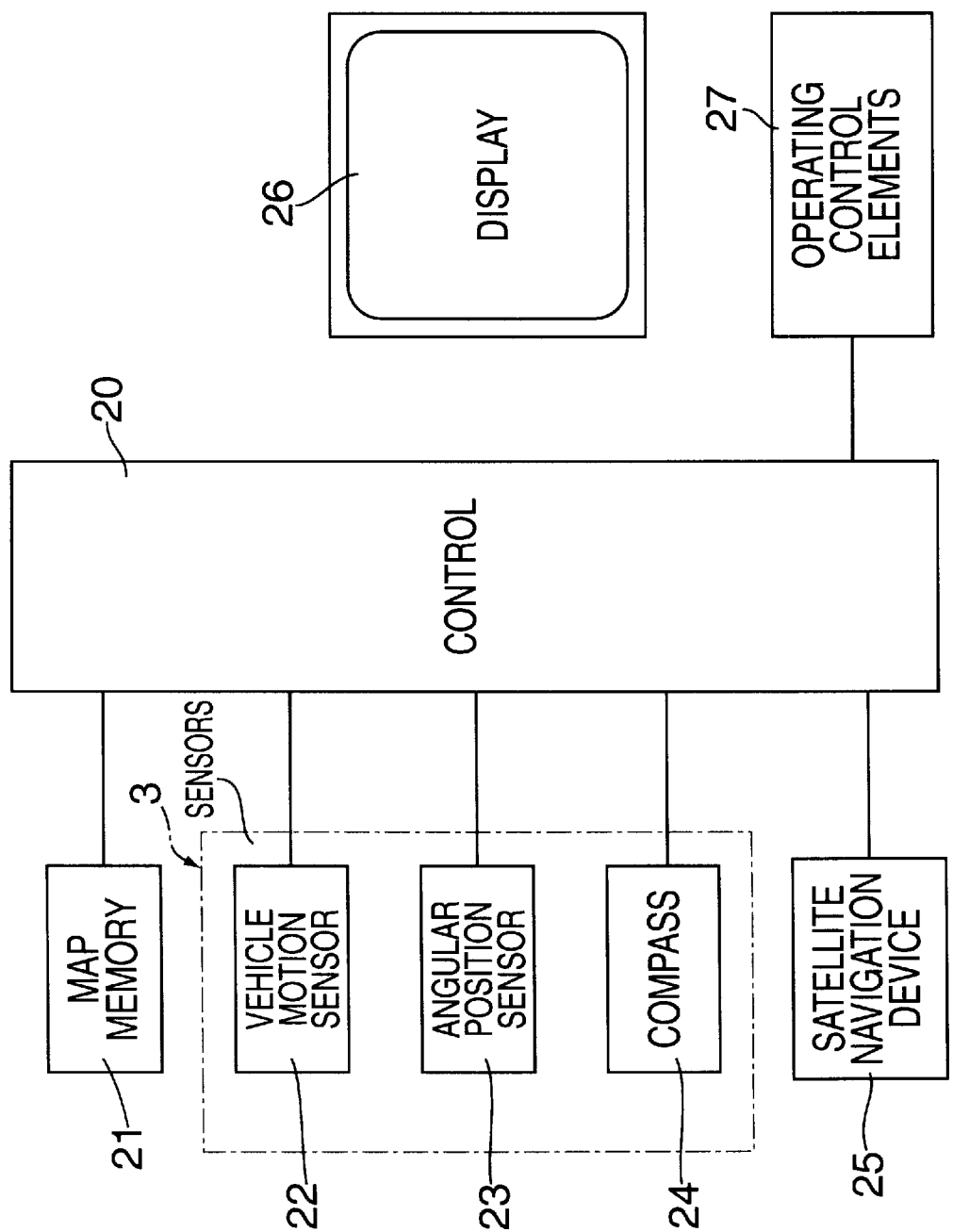
FIG. 1 shows a block diagram of the orientation and navigation device according to the present invention.

The block diagram of FIG. 1 depicts a control 20, which is linked to a display 26 and operating-control elements 27. On the input side, the control 20 is connected to various dead reckoning sensors 3, such as a vehicle-motion sensor 22, an angular-position sensor 23, a compass 24, as well as to a satellite-navigation device 25. Furthermore, the control 20 is linked to a map memory 21, in which the maps are mainly stored digitally. The control 20 includes a microcomputer, as well as internal memory devices, such a unit being known, for example, as a "travel pilot", so further clarification is not needed. A compact-disk storage device is used as a map memory 21, in which, inter alia, the data pertaining to maps of, for example Germany are stored. The map details are selected by means of the operating-control elements 27 and are shown in the desired scale on the display 26. A flashing arrow indicates the position of the vehicle on the map, and the map continues to move under this flashing arrow when the vehicle is driven forwards. The current position is calculated by means of two wheel sensors on one axle, from whose digital pulses, trip distances and angular motion of the vehicle are calculated. Also arranged in the vehicle is a two-axis magnetometer which determines the direction of travel relative to the northern direction from the earth's magnetic field. The geographic compass position is compared by means of map matching to the positively fed back position on the map, and the current position of the vehicle on the street is established by a plausibility check.

A satellite-navigation device 25 is known as a GPS-receiver (Global Positioning System). Depending on its position on the earth's surface, the GPS receiver 25 receives the signals from at least three satellites of the GPS system and calculates its position on the earth's surface based on signal propagation times. This positional data is input into the control 20.

Figure 2:
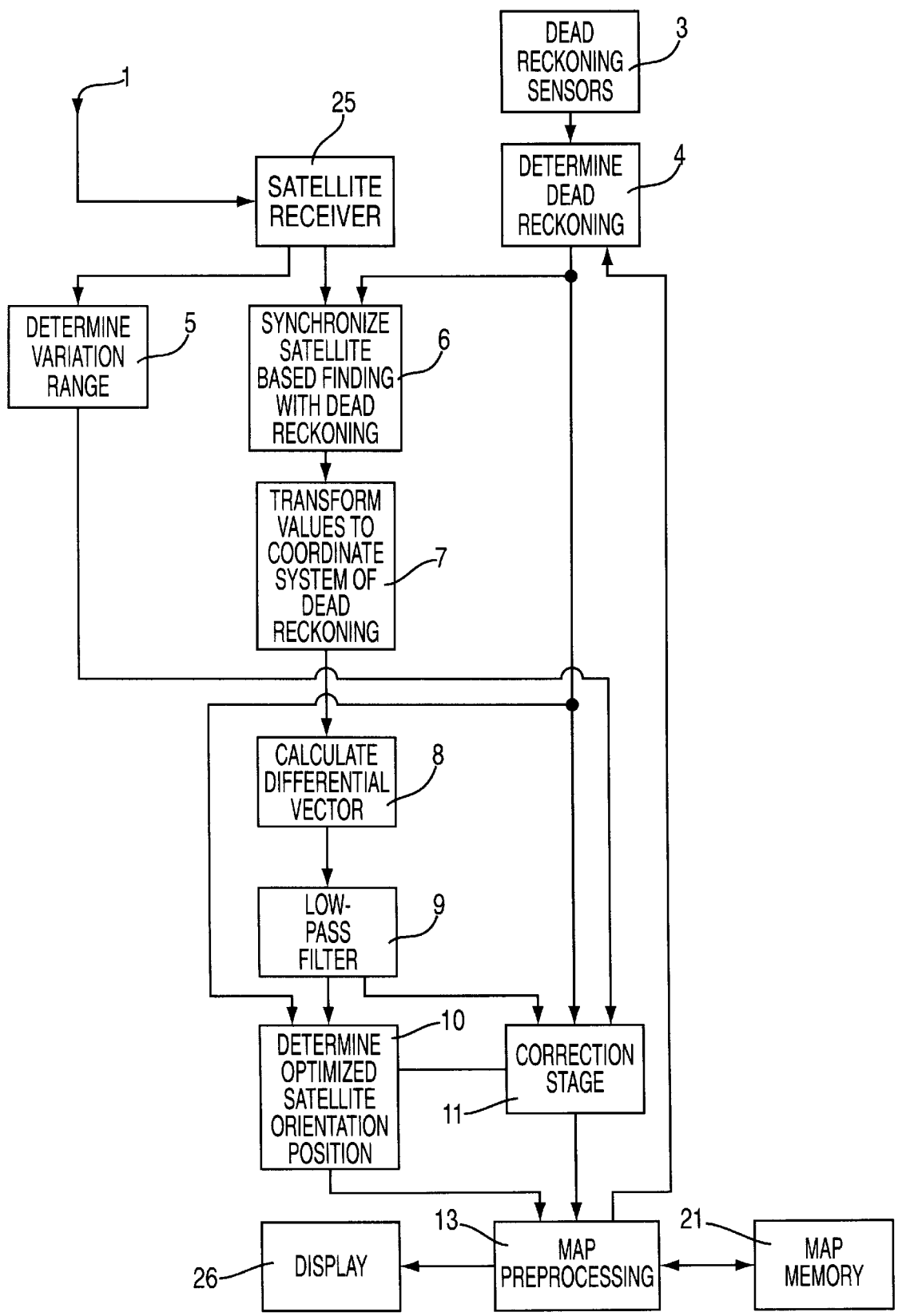
FIG. 2 shows a flow chart of the functioning of the device according to the present invention.

The method of functioning of the device according to the present invention is described in the following on the basis of a flow chart for the functional sequence in accordance with FIG. 2. Working with the known map-supported orientation and navigation device, a dead-reckoning process is initially carried out for the vehicle in position 4 with the aid of dead-reckoning sensors 3. From a map memory 21, the dead-reckoning process receives street data stored on a compact disk (CD), the data having been preprocessed by a map-preprocessing unit 13 for the control 20. These preprocessed street data are shown on the display 26 as a map. In a correction stage 11, the dead-reckoning process 4 checks the plausibility of the ascertained vehicle position and transmits the vehicle position to the map-preprocessing unit 13. A flashing arrow then appears on the display 26, for example, for the vehicle position on the street just travelled on.

Parallel to this per se known positive feedback process, the satellite receiver 25 now receives the satellite signals via the antenna 1 and, from these signals, initially determines a position for the vehicle independently of the dead-reckoning process. In position 6, the satellite-based position finding is synchronized with the dead-reckoning process. This is necessary as the vehicle continues to move during the calculation time and, in the interim, assumes another position. After the values are transformed into the coordinate system of the dead-reckoning process (position 7), a differential vector V is now calculated from these values in position 8 indicating the difference between the dead-reckoning and the satellite-based position finding process.

The available satellite system GPS is freely accessible to everyone, with some limitation. The limitation is that the accuracy of the position determined by the satellites has a variation range. The variation range is dependent upon the number of satellites being simultaneously received and can cover a circle of a 100 m radius or considerably more. This tolerance, which is too large for determining vehicle position, can now be improved with the help of a low-pass filter (position 9). The time constant of the low-pass filter is selected so that, on the one hand, the interference signals of the GPS system will be partially suppressed and so that, on the other hand, a loss of orientation due to vehicle motion will be recognized as quickly as possible. An advantageously empirically determined compromise must be made between these two extreme values. The value filtered by the low-pass filter is now used in position 10 to calculate an optimized satellite orientation position. Since the variation range can be estimated relatively precisely on the basis of empirically determined values when working with at least four (in exceptional cases also three) simultaneously received satellites, a Q (quality) factor is thus achieved for the position determined by the satellites. The variation range is determined in position 5. The values determined in position 10 are transmitted to the map-preprocessing unit 13. The vehicle position and/or, in addition, the position determined by the satellite can now be shown on the display 26.

Figure 3:
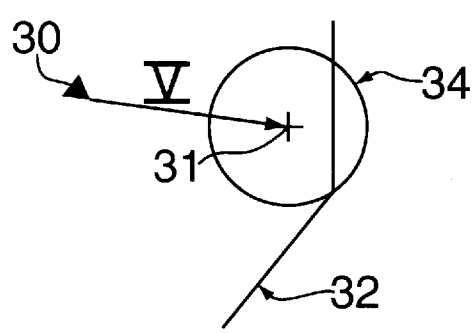
FIG. 3 shows a first example of positional correction according to the present invention.
Figure 4:
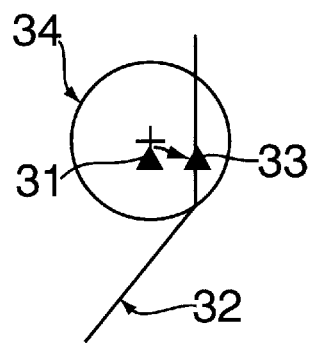
FIG. 4 shows a second example of positional correction according to the present invention.

A first example of positional correction using the device according to the present invention is illustrated in FIG. 3. In principle, it applies that no satellite navigation is carried out when the vehicle is actually situated on a designated street. FIG. 3 shows a street 32, a vehicle located next to the street with a dead-reckoning 30, as well as a satellite position-finding 31. Drawn as a circle around the satellite position-finding 31 is a variation range 34, which was determined with the help of the Q-factor and is supposed to represent the range of uncertainty for the satellite position-finding 31. Drawn in between the dead-reckoning 30 and the satellite position-finding 31 is a vector V, which represents the deviation between the two position finding processes. Since the dead-reckoning position lies outside of the variation range of the satellite-based position finding, the assumption is now made that the dead-reckoning 30 is wrong. This can happen, for example, when the vehicle compass 24 registers a declination because of magnetization influences. However, it can also be the case that the vehicle had been transported by a ferry or a train and, therefore, lost its dead-reckoning. The GPS position is now taken over as a new dead-reckoning position (support) with subsequent map support (map matching), as described in the following with respect to FIG. 3. The assumption is made in FIG. 3 that the vehicle has to reset its dead-reckoning. The position for the dead-reckoning 30 is corrected at this point by the satellite-based position finding in accordance with FIG. 4. FIG. 4 now shows that the new vehicle position is determined by the satellite-based position finding 31. The variation range 34 is drawn in again around the satellite-based position finding 31. The street 32 where the vehicle is now actually situated, as determined by an appropriate plausibility check, now runs within the variation range 34. A correction is now entered within the variation range 34 by means of map matching, so that the satellite-based position finding 31 now shifts the vehicle in parallel on the map to the current position 33. This thus found current position 33 is continued for the further dead-reckoning process. For as long as the vehicle is now situated, within certain limits, within the variation range 34 and is situated on a street, no GPS correction takes place, since, within this range, the vehicle is only guided by the stored map data in conjunction with the vehicle sensors and the compass.

Figure 5:
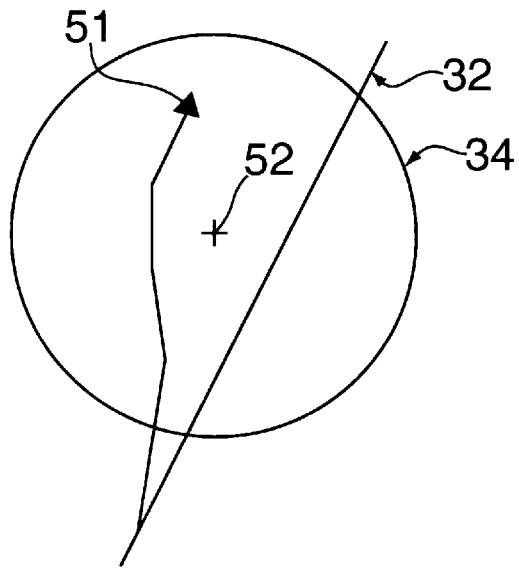
FIG. 5 shows a third example of positional correction according to the present invention.
Figure 6:
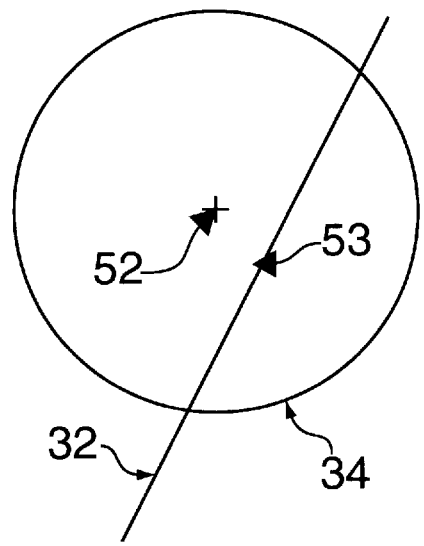
FIG. 6 shows a fourth example of positional correction according to the present invention.

FIG. 5 depicts one exemplary embodiment where a loss of orientation of the dead-reckoning has, in fact, occurred, but the vehicle is still situated within the variation range of the satellite. However, due to the loss of the correction position, the dead-reckoning system no longer finds its way back to the street 32. With the help of the satellite receiver 25, a position 52 and its variation range are again calculated for the vehicle (FIG. 5, FIG. 6). In accordance with FIG. 6, the satellite position 52 is now assumed as the current vehicle position using the map matching method and, parallel to this, the vehicle is placed in position 53 on the street 32. Similarly to FIG. 4, the orientation and navigation device of the vehicle continues the further dead reckoning within this range. Preferably, the GPS position and its variation range are continually calculated in order to control the dead-reckoning.

This per se fully automatic orientation and navigation device according to the present invention no longer requires any manual setting up in the vehicle. However, another refinement of the invention present provides for cursor keys to control the vehicle position, e.g., in order to make fine adjustments.

What is claimed is:

1. An orientation and navigation device for a vehicle, comprising:

at least one dead-reckoning sensor, the dead-reckoning sensor including at least one of a magnetic field compass, a vehicle-motion sensor, and an angular position sensor;

a memory for storing map data;

a display device;

a satellite receiver determining a satellite-based position finding; and a control unit determining a vehicle position and displaying the vehicle position on the display device, the control unit including an arrangement determining a variation range of the satellite-based position finding, the arrangement including a low-pass filter having a selectable time constant, the selectable time constant being selected as a function of the accuracy of the satellite-based position finding and a vehicle speed, the control unit being coupled to each of the at least one dead-reckoning sensor, the memory, the display device, and the satellite receiver, the control unit (i) determining the vehicle position by computing a dead-reckoning as a function of data from the at least one dead-reckoning sensor, (ii) comparing the dead-reckoning to the variation range, (iii) when the dead-reckoning is outside the variation range of the satellite-based position finding, setting the vehicle position to the satellite-based position finding, performing a plausibility check via a map-matching, and setting the vehicle position to a current position on a street, and (iv) displaying the vehicle position as a current position on the display device.

2. The device of claim 1, wherein the map-matching includes comparing the corrected vehicle position with a neighboring map location and the control unit displays the vehicle position on the display device as the current position on an adjacent street.

3. The device of claim 1, wherein the satellite-based position finding is displayed on the display device.

4. The device of claim 1, wherein when the control unit detects a loss of orientation, the control unit initializes a new vehicle position as a function of the satellite-based position finding.

5. The device of claim 1, wherein the control unit cyclically redefines the vehicle position.

6. The device of claim 1, further comprising at least one operation-control element coupled to the control unit, wherein the current position on the display device can be manually shifted via the at least one operation-control element.

7. The device of claim 1, further comprising at least one operation-control element coupled to the control unit, wherein the current position on the display device can be shifted manually via a vector V in the direction of the satellite-based position finding via the at least one operation-control element.

8. The device of claim 1, wherein the variation range is empirically determined.

9. The device of claim 1, wherein the control unit performs the plausibility check via the map-matching by comparing the vehicle position set by the satellite-based position finding with neighboring map data.

10. The device of claim 1, wherein the control unit, in comparing the dead-reckoning to the variation range, computes a difference between the dead-reckoning and the satellite-based position finding, and compares the difference to the variation range.

11. A process for performing orientation and navigation of a vehicle, comprising the steps of:

determining a dead-reckoning vehicle position from at least one signal produced by at least one dead-reckoning sensor;

computing a vehicle position based on the dead-reckoning vehicle position;

determining a satellite-based position finding from a signal produced by a satellite receiver;

determining a variation range of the satellite-based position finding using a low-pass filter having a selectable time constant, the selectable time constant being selected as a function of the accuracy of the satellite-based position finding and a vehicle speed;

comparing the dead-reckoning vehicle position to the variation range;

when the dead-reckoning vehicle position is outside the variation range, setting the vehicle position to the satellite-based position finding, performing a plausibility check by a map-matching, and setting the vehicle position to a current position on a street; and displaying the vehicle position as a current position on a display device.

12. An orientation and navigation device for a vehicle, comprising:

at least one dead-reckoning sensor, the dead-reckoning sensor including at least one of a magnetic field compass, a vehicle-motion sensor, and an angular position sensor;

a memory for storing map data;

a display device;

a satellite receiver determining a satellite-based position finding; and a control unit determining a vehicle position and displaying the vehicle position on the display device, the control unit being coupled to each of the at least one dead-reckoning sensor, the memory, the display device, and the satellite receiver, the control unit (i) determining the vehicle position by computing a dead-reckoning as a function of data from the at least one dead-reckoning sensor, (ii) generating a variation range of the satellite-based position finding, (iii) comparing the dead-reckoning to the variation range, (iv) when the dead-reckoning is outside the variation range of the satellite-based position finding, setting the vehicle position to the satellite-based position finding, performing a plausibility check via a map-matching, and setting the vehicle position to a current position on a street, and (v) displaying the vehicle position as a current position on the display device, wherein the control unit includes means for temporally synchronizing a signal produced by the at least one dead-reckoning sensor and a signal produced by the satellite receiver, wherein the control unit includes an arrangement determining the variation range of the satellite-based position finding, and wherein the arrangement includes a low-pass filter having a selectable time constant, the selectable time constant being selected as a function of the accuracy of the satellite-based position finding and the vehicle speed.

13. The device of claim 12, wherein the map-matching includes comparing the corrected vehicle position with a neighboring map location and the control unit displays the vehicle position on the display device as the current position on an adjacent street.

14. The device of claim 12, wherein the satellite-based position finding is displayed on the display device.

15. The device of claim 12, wherein when the control unit detects a loss of orientation, the control unit initializes a new vehicle position as a function of the satellite-based position finding.

16. The device of claim 12, wherein the control unit cyclically redefines the vehicle position.

17. The device of claim 12, further comprising at least one operation-control element coupled to the control unit, wherein the current position on the display device can be manually shifted via the at least one operation-control element.

18. The device of claim 12, further comprising at least one operation-control element coupled to the control unit, wherein the current position on the display device can be shifted manually via a vector V in the direction of the satellite-based position finding via the at least one operation-control element.

19. The device of claim 12, wherein the variation range is empirically determined.

20. The device of claim 12, wherein the control unit performs the plausibility check via the map-matching by comparing the vehicle position set by the satellite-based position finding with neighboring map data.

21. The device of claim 12, wherein the control unit, in comparing the dead-reckoning to the variation range, computes a difference between the dead-reckoning and the satellite-based position finding, and compares the difference to the variation range.

22. An orientation and navigation device for a vehicle, comprising:
- at least one dead-reckoning sensor, the dead-reckoning sensor including at least one of a magnetic field compass, a vehicle-motion sensor, and an angular position sensor;
- a memory for storing map data;
- a display device;
- a satellite receiver determining a satellite-based position finding; and
- a control unit determining a vehicle position and displaying the vehicle position on the display device, the control unit being coupled to each of the at least one dead-reckoning sensor, the memory, the display device, and the satellite receiver, the control unit
  (i) determining the vehicle position by computing a dead-reckoning as a function of data from the at least one dead-reckoning sensor,
  (ii) generating a variation range of the satellite-based position finding,
  (iii) comparing the dead-reckoning to the variation range,
  (iv) when the dead-reckoning is outside the variation range of the satellite-based position finding, setting the vehicle position to the satellite-based position finding, performing a plausibility check via a map-matching, and setting the vehicle position to a current position on a street, and
  (v) displaying the vehicle position as a current position on the display device,
- wherein the satellite receiver receives GPS coordinates and the control unit includes means for transforming the GPS coordinates into a dead-reckoning vehicle position coordinate system,
- wherein the control unit includes an arrangement determining the variation range of the satellite-based position finding and
- wherein the arrangement includes a low-pass filter having a selectable time constant, the selectable time constant being selected as a function of the accuracy of the satellite-based position finding and the vehicle speed.

23. The device of claim 22, wherein the map-matching includes comparing the corrected vehicle position with a neighboring map location and the control unit displays the vehicle position on the display device as the current position on an adjacent street.

24. The device of claim 22, wherein the satellite-based position finding is displayed on the display device.

25. The device of claim 22, wherein when the control unit detects a loss of orientation, the control unit initializes a new vehicle position as a function of the satellite-based position finding.

26. The device of claim 22, wherein the control unit cyclically redefines the vehicle position.

27. The device of claim 22, further comprising at least one operation-control element coupled to the control unit, wherein the current position on the display device can be manually shifted via the at least one operation-control element.

28. The device of claim 22, further comprising at least one operation-control element coupled to the control unit, wherein the current position on the display device can be shifted manually via a vector V in the direction of the satellite-based position finding via the at least one operation-control element.

29. The device of claim 22, wherein the variation range is empirically determined.

30. The device of claim 22, wherein the control unit performs the plausibility check via the map-matching by comparing the vehicle position set by the satellite-based position finding with neighboring map data.

31. The device of claim 22, wherein the control unit, in comparing the dead-reckoning to the variation range, computes a difference between the dead-reckoning and the satellite-based position finding, and compares the difference to the variation range.

32. An orientation and navigation device for a vehicle, comprising:
- at least one dead-reckoning sensor, the dead-reckoning sensor including at least one of a magnetic field compass, a vehicle-motion sensor, and an angular position sensor;
- a memory for storing map data;
- a display device;
- a satellite receiver determining a satellite-based position finding; and
- a control unit determining a vehicle position and displaying the vehicle position on the display device, the control unit being coupled to each of the at least one dead-reckoning sensor, the memory, the display device, and the satellite receiver, the control unit
  (i) determining the vehicle position by computing a dead-reckoning as a function of data from the at least one dead-reckoning sensor,
  (ii) generating a variation range of the satellite-based position finding,
  (iii) comparing the dead-reckoning to the variation range,
  (iv) when the dead-reckoning is outside the variation range of the satellite-based position finding, setting the vehicle position to the satellite-based position finding, performing a plausibility check via a map-matching, and setting the vehicle position to a current position on a street, and
  (v) displaying the vehicle position as a current position on the display device,
- wherein when the calculated vehicle position is set to the satellite-based position finding, the control unit moves a shifted vehicle position into a current position on a street of a map, the street running substantially parallel to a direction of travel of the vehicle and which is inside the variation range of the satellite-based position finding,
- wherein the control unit includes an arrangement determining the variation range of the satellite-based position finding, and
- wherein the arrangement includes a low-pass filter having a selectable time constant, the selectable time constant being selected as a function of the accuracy of the satellite-based position finding and the vehicle speed.

33. The device of claim 32, wherein the map-matching includes comparing the corrected vehicle position with a neighboring map location and the control unit displays the vehicle position on the display device as the current position on an adjacent street.

34. The device of claim 32, wherein the satellite-based position finding is displayed on the display device.

35. The device of claim 32, wherein when the control unit detects a loss of orientation, the control unit initializes a new vehicle position as a function of the satellite-based position finding.

36. The device of claim 32, wherein the control unit cyclically redefines the vehicle position.

37. The device of claim 32, further comprising at least one operation-control element coupled to the control unit, wherein the current position on the display device can be manually shifted via the at least one operation-control element.

38. The device of claim 32, further comprising at least one operation-control element coupled to the control unit, wherein the current position on the display device can be shifted manually via a vector V in the direction of the satellite-based position finding via the at least one operation-control element.

39. The device of claim 32, wherein the variation range is empirically determined.

40. The device of claim 32, wherein the control unit performs the plausibility check via the map-matching by comparing the vehicle position set by the satellite-based position finding with neighboring map data.

41. The device of claim 32, wherein the control unit, in comparing the dead-reckoning to the variation range, computes a difference between the dead-reckoning and the satellite-based position finding, and compares the difference to the variation range.

* * * * *